United States Patent [19]
Schlamann et al.

[11] 3,884,529
[45] May 20, 1975

[54] TRAILER BRAKE CYLINDER PRESSURE VARIED IN ACCORDANCE WITH VARIATIONS OF TRACTOR BRAKE CYLINDER PRESSURE IN RESPONSE TO TRACTOR WHEEL SLIP

[75] Inventors: Wilhelm Schlamann, Altwarmbuchen; Herbert Merz, Hannover, both of Germany

[73] Assignee: Westinghouse Bremsen-und Apparatebau GmbH, Hannover, Germany

[22] Filed: July 30, 1973

[21] Appl. No.: 383,995

[30] Foreign Application Priority Data
Aug. 24, 1972 Germany.......................... 2241704

[52] U.S. Cl................. 303/7; 303/21 AF; 303/21 F
[51] Int. Cl. ...................... B60t 13/10; B60t 13/66
[58] Field of Search ............ 303/7, 8, 21 AF, 21 A, 303/21 F; 188/181 C

[56] References Cited
UNITED STATES PATENTS

| | | | |
|---|---|---|---|
| 3,237,994 | 3/1966 | Brandon | 303/7 |
| 3,674,317 | 7/1972 | Mangold | 303/21 AF X |
| 3,756,661 | 9/1973 | Michellone | 303/7 |

*Primary Examiner*—Trygve M. Blix
*Assistant Examiner*—Barry L. Kelmachter
*Attorney, Agent, or Firm*—W. F. Poore; R. W. McIntire, Jr.

[57] ABSTRACT

The invention covers a pressure-operated braking apparatus for tractor trailer motor vehicles with brake cylinders, where the tractor brake cylinder pressures can be regulated individually or in groups by an antilocking device, and where a pressure-operated trailer control valve is provided for controlling the trailer brake cylinder pressure in accordance with variations in the sum of the tractor brake cylinder pressures.

3 Claims, 5 Drawing Figures

TRAILER BRAKE CYLINDER PRESSURE VARIED IN ACCORDANCE WITH VARIATIONS OF TRACTOR BRAKE CYLINDER PRESSURE IN RESPONSE TO TRACTOR WHEEL SLIP

BACKGROUND OF THE INVENTION

With brake apparatus of this type, locking of the tractor vehicle wheels is prevented even if the driver applies an excessively high brake cylinder pressure.

If a tractor vehicle equipped with such an anti-locking braking apparatus is connected to a trailer that has no antilocking device of its own, there is a danger of excessive trailer braking in case of low traction coefficient between the trailer tires and the road surface, because the trailer control valve is being actuated by the excessively high brake cylinder pressure. This can endanger road traffic because it may cause the trailer to swerve.

There have been suggestions to make the anti-locking device of the tractor vehicle disconnectible, and to make disconnection mandatory if the trailer is not also equipped with an anti-locking device.

However, this proposition is not practical since most commercial tractor vehicles, particularly the heavy ones, are operated with trailers. The anti-locking device of the tractor motor vehicle would, therefore be practivally useless for commercial vehicles as long as trailers are not also equipped with anti-locking devices. This will be the case for the foreseeable future.

SUMMARY OF THE INVENTION

The purpose of the present invention is to provide a pressure-operated tractor trailer braking apparatus which permits control of the trailer braking system in such a manner that, with the anti-locking device of the tractor motor vehicle being effective, excessive braking of a trailer that has no anti-locking of its own is avoided, so that the anti-locking device of the tractor motor vehicle can be left switched in permanently and thus forms an integral part of the tractor trailer vehicle braking apparatus.

The invention resolves this problem in such a manner, that the trailer control valve can be actuated by one or more of the controlled pressures in the tractor motor vehicle brake cylinders.

Thus the trailer braking in case of a trailer without its own anti-locking device can be regulated in principle in the same way as that of the tractor motor vehicle braking apparatus, but in line with the actual brake forces on the tractor, since, with a tractor motor vehicle braking apparatus having an anti-locking device the regulated brake cylinder pressures correspond to the generated brake forces which are transmitted to the road surface.

The invention further provides that, with pressure-operated braking apparatus of the aforementioned type where the brake cylinder pressures in the front tractor wheel brake cylinders are controllable independently of the rear tractor wheel brake cylinders, the trailer control valve can be actuated by at least one of the controlled brake cylinder pressures in the front wheel brake cylinders.

By this method a trailer brake effect in dependence on the dynamic axle load of the tractor motor vehicle front axle is attained, which is of particular advantage when the loading condition "tractor motor vehicle empty - trailer loaded" has to be dealt with.

The invention also provides that, with pressure-operated braking apparatus of the aforementioned type where the brake cylinder pressures of the tractor rear wheel brake cylinders are controllable independently of the pressure in the tractor front wheel brake cylinders, the trailer control valve can be actuated by at least one of the controlled brake cylinder pressures in the rear wheel brake cylinders.

This arrangement results in a particularly favorable trailer brake cylinder pressure control in case of semi-trailers where the loading condition of the trailer has a considerable effect on the load on the rear axle of the tractor.

In order to attain a trailer braking force which corresponds entirely to the actual tractor motor vehicle braking forces, the invention also provides that, with a tractor motor vehicle braking apparatus where the brake cylinder pressures of the front wheel brake cylinders and those of the rear wheel brake cylinders are controllable independently, the trailer control valve can be actuated by the controlled brake cylinder pressure of at least one tractor front wheel brake cylinder, and/or by the controlled brake cylinder pressure of at least one tractor rear wheel brake cylinder.

In such cases it is practical to actuate the trailer control valve by the higher of the two independently controlled brake cylinder pressures or by adding together at least two of these pressures.

In this manner a particularly good utilization of the brake force absorption capacity at the trailer and a very favorable control characteristic for the trailer braking can be attained by suitable proportioning of the valve piston areas exposed to pressure.

The invention further provides that, with pressureoperated braking apparatus of the aforementioned type where the brake cylinder pressures for the tractor motor vehicle wheels are separately controllable, the trailer control valve can be actuated by the average of the separately controlled brake cylinder pressures at the respective tractor motor vehicle wheels.

It is thereby possible to compensate for differences in braking at the left and at the right side respectively. Besides, the average value is the result of smaller fluctuations of the pressure pattern.

With pressure-operated braking apparatus with two or more circuits, it is practical to have the trailer control valve actuated by the controlled brake cylinder pressures of at least two brake cylinders which are connected to different brake circuits.

In this manner a regular and safe way of trailer braking is assured even if one brake circuit fails.

It is also practical to operate the trailer control valve, via a two-position switch-over valve mounted ahead of it, either by one or more of the controlled tractor motor vehicle brake cylinder pressures, or by the unregulated brake cylinder pressure admitted through the brake valve.

This arrangement permits satisfactory operation also with trailers equipped with their own anti-locking devices, particularly for the loading condition "Motor vehicle empty - trailer loaded."

The invention is explained below in more detail by means of design examples shown on attached drawings.

FIG. 5 shows a single-pipe braking apparatus with actuation of the trailer control valve by the controlled rear tractor wheel brake cylinder pressure or by the unregulated operator selected brake cylinder pressure for the tractor vehicle.

DESCRIPTION – FIG. 1

Figure 1:
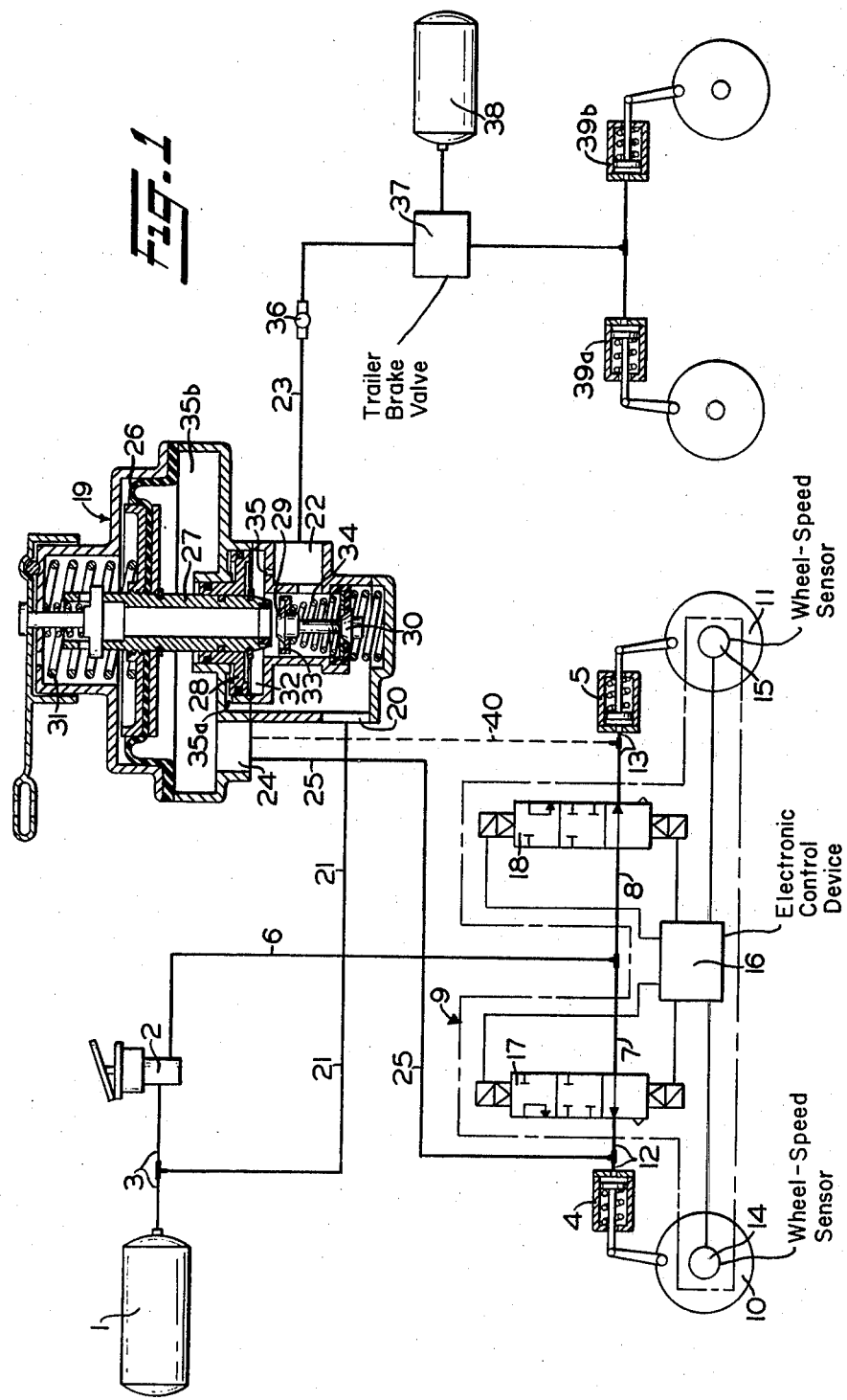
FIG. 1 shows a single-pipe braking apparatus for one side of a tractor trailer with separate tractor vehicle brake cylinder pressure control for the front and rear tractor wheels respectively, and actuation of a trailer control valve in accordance with the variations of the front wheel brake cylinder pressure.

In the drawings, only the wheels and brake cylinders therefor at one side of the tractor trailer are shown. It will be understood, however, that the braking forces applied to the corresponding wheels on each side of the tractor trailer are the same.

The braking apparatus for a tractor trailer shiown schematicaly in FIG. 1 includes a compressed-air container 1, a manually operated brake valve 2, that is connected with the container 1 via tubing 3, as well as brake cylinders 4 and 5 for the front and rear wheels respectively at one side of a tractor motor vehicle (Vehicle not shown). Brake cylinders 4 and 5 at each side of the tractor are connected with brake valve 2 by tubing 6, 7 and 8. The brake cylinder pressures are controllable by an anti-locking device 9. Compressed-air container 1, brake valve 2, brake cylinders 4 and 5, and anti-locking device 9 form together a tractor motor vehicle braking apparatus, where the purpose of brake valve 2 is to admit a certain operator selected tractor brake cylinder pressure which is being modulated by the anti-locking device 9 so as to prevent locking of the tractor motor vehicle wheels, these wheels on the one side being denoted by the reference numerals 10 and 11. The modulated brake pressures are then transmitted via tubing 12 and 13 into brake cylinders 4 and 5 of the tractor motor vehicle.

The anti-locking device 9 consists of sensors 14 and 15 respectively, only those at one side of the tractor being shown, for sensing the variations in wheel speed of the separate tractor wheels, an electronic control device 16 which converts the wheel deceleration and acceleration into control signals, and solenoid-operated control valves 17 or 18, only those at one side of the tractor being shown, which are actuated by these control signals so as to provide for the supply of compressed air into the brake cylinders 4 or 5 at the one side, or exhaust of it from these cylinders. The electronic control device 16 is so arranged that together with sensors 14 and control valves 17 on one hand, and sensors 15 and control valves 18 on the other hand, it forms two independently functioning control circuits, one of which controls the braking force on the front pair of tractor wheels 10 and the other the braking force on the rear pair of tractor wheels 11.

The tractor motor vehicle braking apparatus also incorporates a trailer control valve device 19 for the control of a trailer braking system. Design and operating principle of the trailer control valve device 19 are known, and are therefore described below only briefly.

Trailer control valve device 19 is connected to compressed-air container 1 via inlet port 20 and tubing 3 and 21. It is also connected to the brake system of a trailer via outlet port 22 and tubing 23, and to the tractor motor vehicle front wheel brake cylinders 4 via control port 24 and tubing 12 and 25.

Trailer control valve device 19 features a diaphragm 26 secured to a valve sleeve 27, a stepped piston 28 and a double valve spindle 29, 30 which serves as an inlet and outlet valve.

Operation – FIG. 1

In an initial charging position, a compression spring 31 biases diaphragm 26 and valve sleeve 27 downward from the position in which they are shown to a lower position in which the lower end of the sleeve 27 seats on outlet or exhaust valve 29 to close it thereby cutting off pipe 23 from atmosphere and the inlet valve 30 is opened. Compressed air then flows from container 1 through inlet port 20, past open inlet valve 30, and thence via outlet port 22 to tubing 23 that is connected to the trailer by hose coupling 36.

Furthermore, compressed air that flows past open inlet valve 30 flows to a chamber 32 beneath stepped piston 28 via the clearance between an upper spring seat 33 for a spring 34 and the wall surface of a bore in the body of the trailer control valve device 19 and also via a choke 35 in this body. Compressed air that flows through the inlet port 20 flows through a second choke 35a in the control valve body to the upper side of the piston 28.

Since the area of the upper side of the piston 28 that is subject to air under pressure is less than the area of the lower side of this piston that is subject to the compressed air supplied to the chamber 32, as soon as the pressure in the chamber 32 has increased sufficiently to overcome the force of spring 31, piston 28 will be moved upward whereupon spring 34 is rendered effective to move valves 29 and 30 and sleeve 27 upward until the inlet valve 30 is closed thereby cutting off flow of compressed air to the trailer.

If now air under pressure is admitted to tubing 25 by manual operation of the brake valve 2 on the tractor to supply compressed air to the tractor brake cylinders 4 and 5 via tubings 6, 7 and 8, control valves 17 and 18, and tubing 12 and 13 to effect a brake application of the tractor, this air under pressure flows via control port 24 to a chamber 35b below the diaphragm 26. As the pressure in the chamber 35b increases, it is effective to deflect this diaphragm 26 upward and thereby move valve sleeve 27 upward against the yielding resistance of spring 31. A very small pressure of about 0.2 to 0.4 ats. is sufficient to effect this movement. Outlet valve 29 is thereby opened, causing a sudden pressure drop in trailer brake tubing 23 through escape of compressed air via the choke 35 and clearance between the upper spring seat 33 and the wall of the bore in the body, valve sleeve 27 and a port in the cover, the pressure drop being that required for effecting a brake application on the trailer. The termination of the pressure drop comes about by the sleeve 27 closing outlet valve 29. This is caused by stepped piston 28 which, upon drop of the pressure in chamber 32 and acting upon its lower piston area, is depressed by the air container pressure acting upon its upper piston area, whereby valve sleeve 27 is seated on outlet valve 29.

A further pressure rise in the pressure of compressed air supplied to tubing 25 causes a further drop of pressure in trailer brake tubing 23, to thereby increase the degree of the brake application on the trailer.

If, however, the pressure in tubing 25 is reduced, valve sleeve 27 is moved downward by spring 31 to again open inlet valve 30 and keep it open until the pressure in trailer brake tubing 23 has again reached a correspondingly higher value. In this manner, the pressure in trailer brake tubing 23 can be sensitively and in fact continuously controlled to thereby control operation of the brakes on the trailer.

The trailer brake system which is connected to trailer brake tubing 23 via hose coupling 36, consists of a trailer brake valve 37, a compressed-air reservoir 38, and brake cylinders 39a and 39b. Air reservoir 38 is filled with compressed air from air reservoir 1 of the tractor motor vehicle braking apparatus via inlet valve 30, when open, of trailer control valve 19 and trailer brake valve 37.

When air under pressure is introduced into tubing 25, trailer control valve device 19 causes a drop of pressure in trailer brake tubing 23, which in turn effects operation of trailer brake valve 37 so that air reservoir 38 will then be connected to trailer brake cylinders 39a and 39b to cause a brake application on the trailer. If, however, the pressure in tubing 25 is reduced, trailer control valve device 19 will induce a pressure rise in trailer brake tubing 23 which in turn will operate the trailer brake valve 37, thus connecting the trailer brake cylinders 39a and 39b to the atmosphere to release the brakes on the trailer.

Trailer control valve device 19 is actuated by the brake cylinder pressure in the front wheel brake cylinders 4 via tubing 25, the cylinder pressure being controlled by anti-locking device 9. The brake pressure in trailer brake cylinders 39a and 39b therefore always corresponds to the actual brake forces which are being transmitted by the tires to the road surface depending on the traction coefficient. Thus excessive trailer braking is avoided without the necessity of equipping the trailer with its own anti-locking device. On the other hand, the tractor motor vehicle anti-locking device can remain permanently switched on irrespective of whether the tractor motor vehicle is being driven connected to a trailer or not. It can, therefore, be considered an integral part of the tractor motor vehicle braking apparatus.

The control of the trailer brake valve device 19 by the controlled brake cylinder pressure in the tractor motor vehicle front wheel brake cylinders results in a trailer braking effect proportionate to the pressure of the air in the front tractor brake cylinders and is, therefore, particularly advantageous when driving is intended with an empty tractor motor vehicle and a loaded trailer.

With semi-trailers, however, considering the loading conditions at the rear axle of the tractor, it is better to actuate the trailer control valve device 19 by the controlled pressure in the rear wheel brake cylinders 5 via tubing 40, shown as a dotted line, in which case tubing 25 will not be required.

DESCRIPTION – FIG. 2

Figure 2:
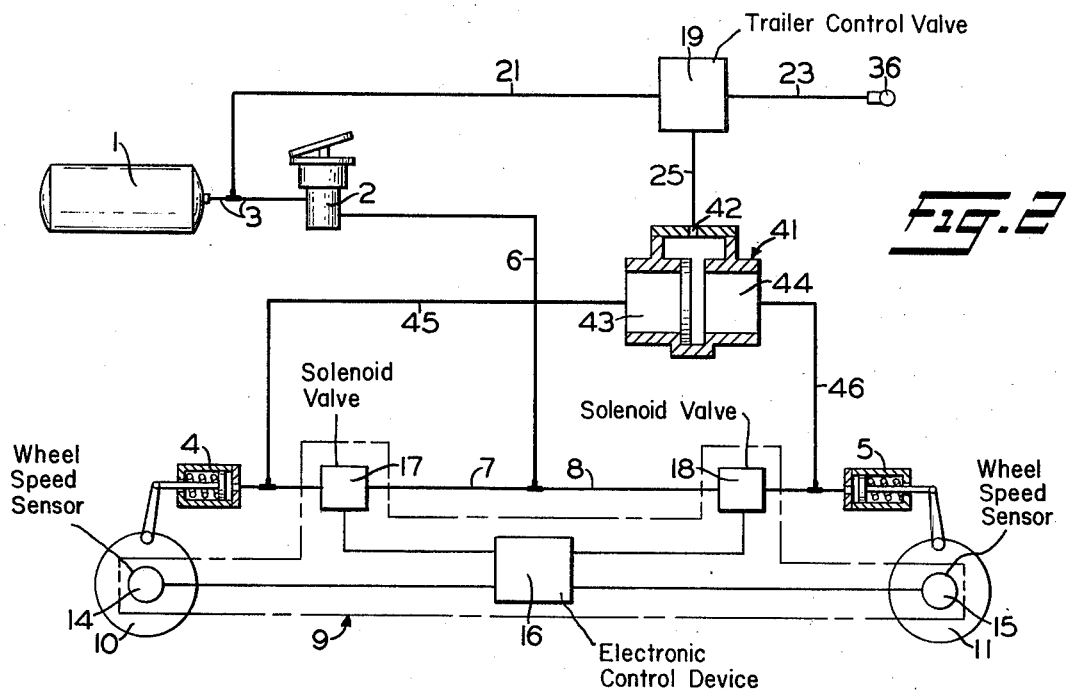
FIG. 2 shows a variation of the braking apparatus according to FIG. 1, with actuation of the trailer control valve by the higher of two separately controlled brake cylinder pressures.

The tractor motor vehicle braking installation depicted in FIG. 2 differs from that in FIG. 1 merely in the incorporation, ahead of trailer control valve device 19, of a changeover or double-check valve device 41, whose outlet port 42 is under the higher of the two pressures at inlet ports 43 and 44. Outlet port 42 is connected to trailer control valve device 19 via tubing 25. Inlet ports 43 and 44 are connected to tractor motor vehicle front wheel brake cylinders 4 and rear wheel brake cylinders 5 respectively via tubing 45 and 46 respectively.

OPERATION – FIG. 2

By means of changeover or double-check valve device 41, trailer control valve device 19 is actuated by the higher of the two separately controlled brake cylinder pressures in the front wheel brake cylinders 4 and the rear wheel brake cylinders 5 respectively. In this manner, the most favorable conditions can be atained to suit the type of vehicle. Instead of changeover or double-check valve device 41, a two-way valve can also be used. The two-way valve can be spring-operated on one end, or it can be designed with differential piston areas. The last mentioned design lends itself to any desired control characteristics.

DESCRIPTION – FIG. 3

Figure 3:
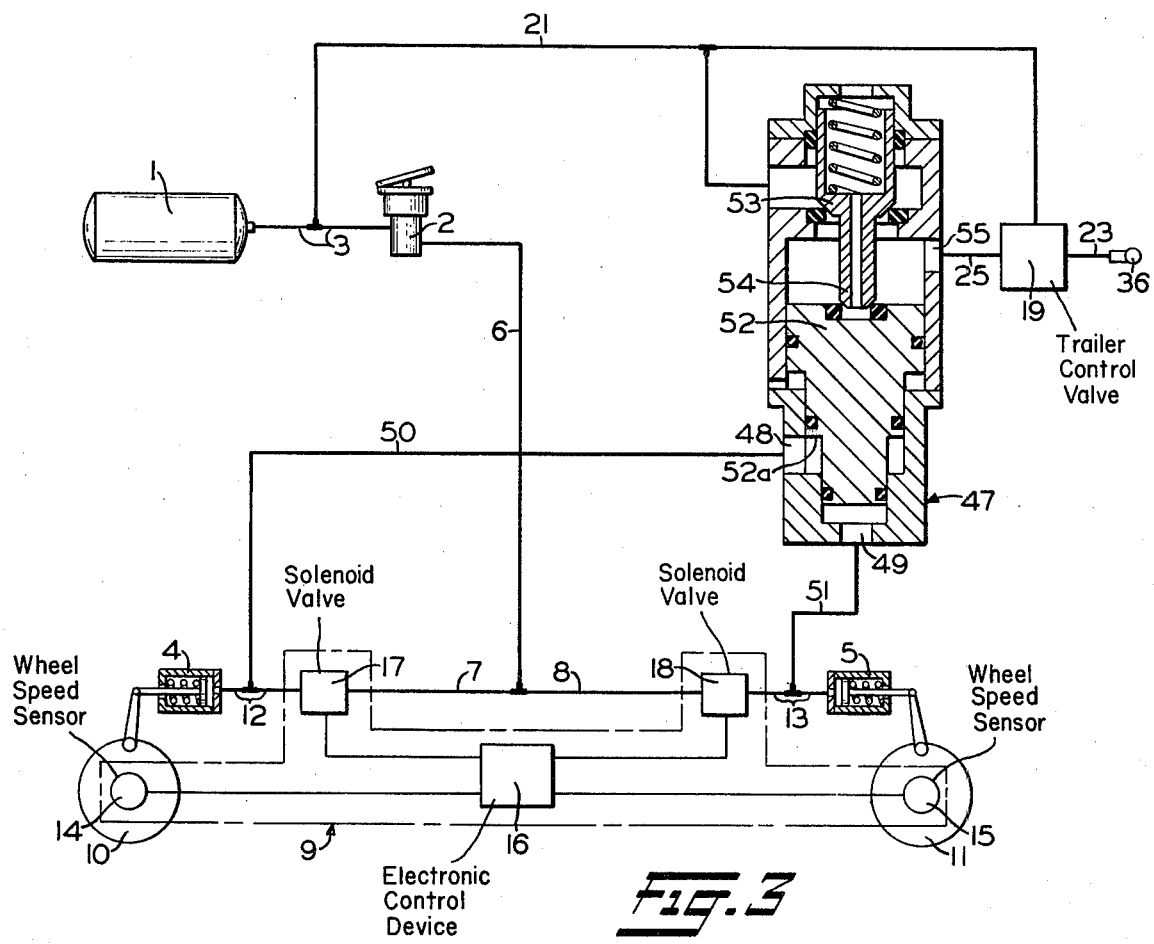
FIG. 3 shows a further variation of the braking apparatus according to FIG. 1, with actuation of the trailer control valve by the sum of two separately controlled brake cylinder pressures.

The motor vehicle braking installation shown in FIG. 3 differs from the arrangement in FIG. 1 only inasmuch as a pressure control valve means 47 is installed ahead of trailer control valve device 19. The exit pressure of valve means 47 is in a definite proportion to the sum of the two inlet pressures entering the valve. Pressure control valve means 47, shown schematically and in simplified manner, has two inlet ports 48 and 49 which are connected to the motor vehicle front wheel brake cylinders 4 and rear wheel brake cylinders 5 respectively via tubing 50 and 51 respectively. A differential-type abutment means 52 comprises a cylindrical member the opposite ends of which constitute two pistons of unequal area. Intermediate its ends this cylindrical member has formed integral therewith a third piston. This third piston is supplied with fluid under pressure from the front wheel brake cylinder 4 via tubing 50 and the smaller piston at one end of the cylindrical member is supplied with fluid under pressure from the rear wheel brake cylinder 5 via tubing 51. The larger piston at the other end of the cylindrical member is subject to the fluid under pressure supplied to the trailer control valve device 19 when it actuates an exhaust valve 54 to its closed position and a supply valve 53 to its open position, this fluid under pressure being supplied from the main reservoir 1 to the trailer control valve device 19 via an outlet port 55 and tubing 25. When the supply valve 53 is closed and the exhaust valve 54 is opened, fluid under pressure is released from the trailer control valve device 19 to atmosphere.

OPERATION – FIG. 3

The lower or smaller end of the differential-type abutment means 52 is subject to air under pressure supplied from the tractor rear brake cylinders 5 via inlet port 49 and tubings 51 and 13. Intermediate its ends, the differential-type abutment means 52 has an annular piston area 52a that is subject to air under pressure supplied from the tractor front brake cylinders 4 via inlet port 48 and tubings 50 and 12. Therefore, when valve 53 is unseated by upward movement of the differential-type abutment means 52, the pressure obtained in the tubing 25 and acting on the upper end of this abutment means 52 over an area equal to the difference in the area of this upper end and the area of the exhaust valve 54 is dependent on the area of the lower end of the abutment means 52 and the size of the annular piston area 52a. By proper selection of these areas, it is possible to obtain any desirable pressure in the tubing 25 for operating the trailer control valve device 19.

In a tractor vehicle brake apparatus when the anti-locking devide 9 controls the brake cylinder pressure separately for at least one front wheel and one rear wheel, it is readily possible, by making the annular piston area 52a equal to the area of the lower end of the abutment means 52, to actuate the trailer control valve device 19 by the average value of two separately controlled brake cylinder pressures.

Furthermore, the annular piston area 52a may be subject to the pressure in either the right or left front brake cylinder, and the area of the lower end of the differential-type abutment means 52 may be subject to the pressure in either the right or left rear brake cylinder. Thus, the difference in the braking forces on the right and left-hand sides of the tractor is compensated for. However, this difference is usually small or is nothing at all.

DESCRIPTION – FIG. 4

Figure 4:
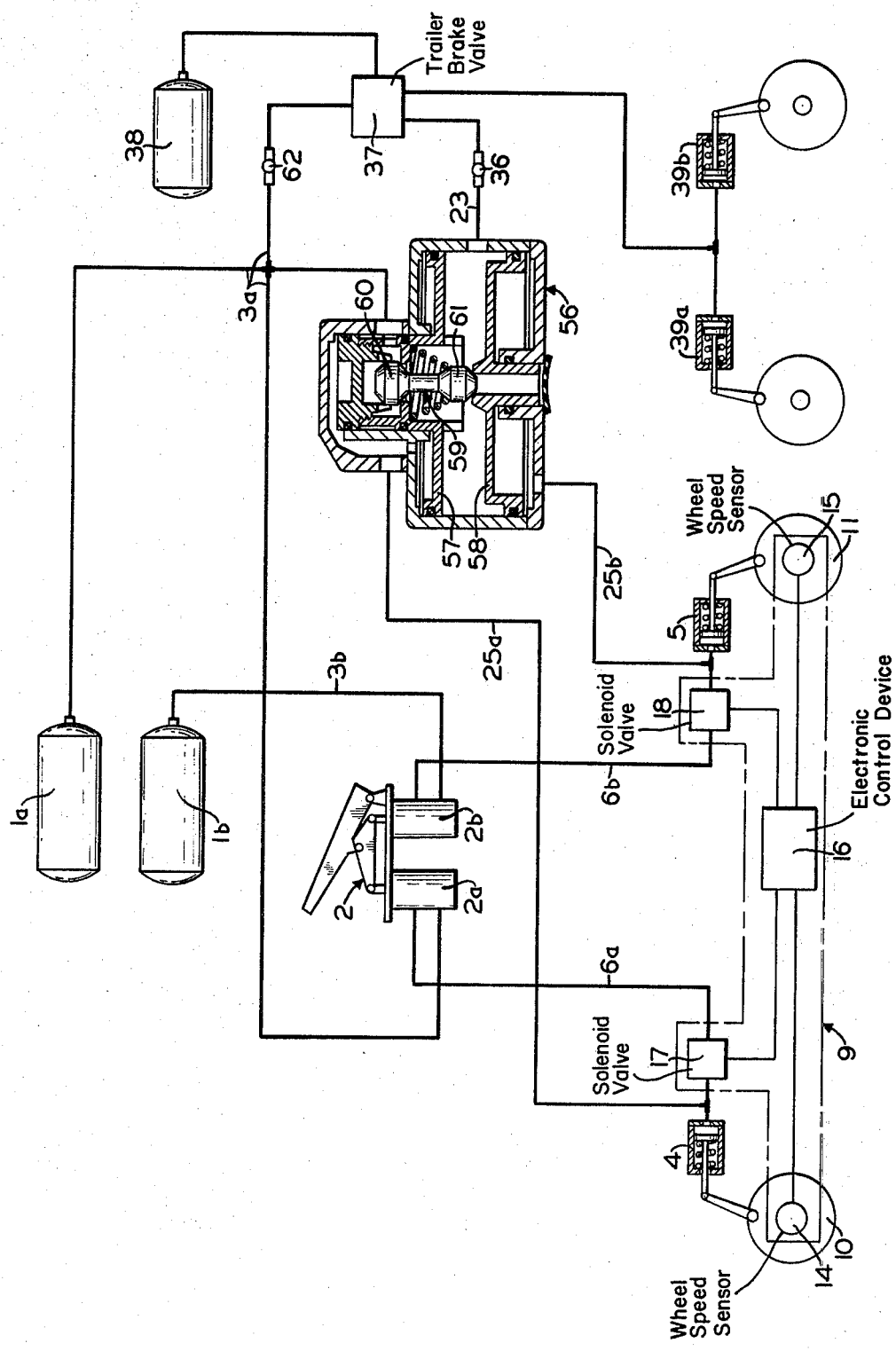
FIG. 4 shows a two-pipe braking apparatus for one side of a tractor-trailer with actuation of the trailer control valve by the controlled brake cylinder pressures in the two pipes.
Figure 9:
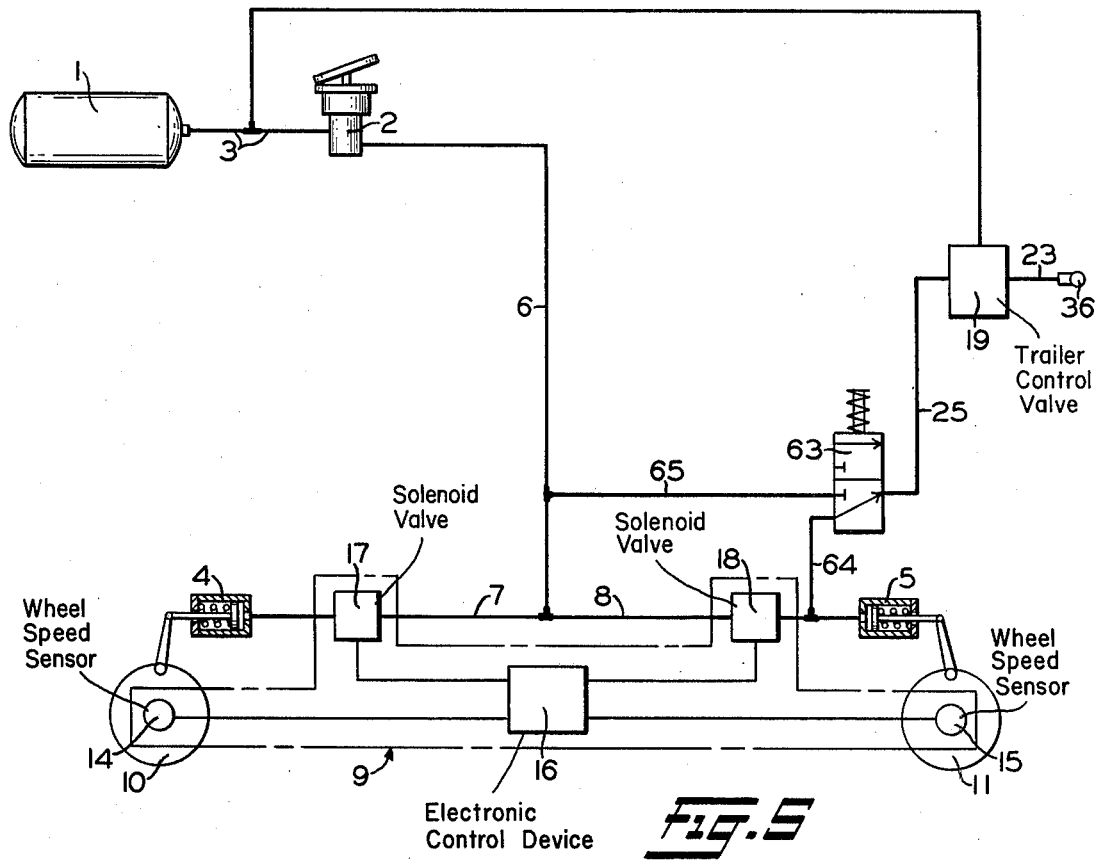

The dual-line braking arrangement shown in FIG. 4 includes a tractor motor vehicle braking apparatus that comprises two compressed air containers 1a and 1b respectively, two brake valves 2a and 2b to form a tandem valve 2, the two brake valves 2a and 2b being connected to compressed air containers 1a and 1b via tubing 3a and 3b respectively, front wheel brake cylinders 4 and rear wheel cylinders 5 which cylinders are connected with the respective brake valves 2a and 2b via tubing 6a and 6b. The pressures in brake cylinders 4 and 5 are regulated by an anti-locking device 9 whose design and function are identical with those of anti-locking device 9 in FIG. 1.

The tractor motor vehicle brake apparatus also includes a trailer control valve 56 designed as a relay valve having two relay pistons 57 and 58 which are movable relative to each other, and a cylindrical member 59 that has at one end an inlet valve 60 and at the other end an outlet valve 61.

OPERATION – FIG. 4

Relay pistons 57 and 58 are acted upon respectively by the controlled brake cylinder pressure in the front wheel brake cylinders 4 and in the rear wheel brake cylinders 5 via tubing 25a and 25b. These pistons 57 and 58 actuate the inlet and outlet valves 60 and 61 respectively in such a manner that the trailer control valve 56 supplies pressure into tubing 23 the value of which is determined by the pressures transmitted via tubing 25a and 25b to relay pistons 57 and 58. If one of these pressures fails, the second one alone can take over the control of trailer brake valve 56 via relay pistons 57 and 58 respectively. Thus the actuation of the trailer brake valve 56 by a controlled motor vehicle brake cylinder pressure is assured even if one of the two brake circuits is out of action.

The trailer brake apparatus connected to tubing 3a and 23 via hose couplings 62 and 36 differs from the trailer brake apparatus shown in FIG. 1 only with regard to compressed air container 38 of the trailer which is here shown charged via two branches of tubing 3a and trailer brake valve 37. The pressurizing and exhausting of trailer brake cylinders 39a and 39b is, however, effected by operation of the trailer brake valve 37 by means of variations of the pressure in trailer brake tubing 23, exactly as with the installation shown in FIG. 1. Since this pressure is always dependent upon the tractor motor vehicle brake cylinder pressure, excessive braking of a trailer which does not have its own anti-locking device cannot occur.

DESCRIPTION – FIG. 5

The motor vehicle braking installation shown in FIG. 5 differs from the arrangement in FIG. 1 only with respect to a two-position or switchover valve device 63 which is provided ahead of trailer control valve device 19, and through which trailer control valve 19, depending on the position of the valve device 63, is connected either to the tractor motor vehicle rear wheel brake cylinders 5 via tubing 25 and 64, or to the tractor motor vehicle brake valve 2 via tubing 25, 65 and 6. The trailer control valve device 19 can thereby be actuated either by the controlled brake cylinder pressure in the rear wheel brake cylinders 5, in case of a trailer without its own anti-locking device, or by the unregulated pressure admitted through brake valve 2, in case of a trailer having its own anti-locking device.

OPERATION – FIG. 5

To attain a rapid application of the trailer brake, it is practical to actuate the trailer control valve device 19 first by the pressure from brake valve 2 up to a predetermined low pressure value, and only from there on by the controlled brake cylinder pressure or pressures. Depending on the desired control characteristic, the limited pressure from the brake valve 2 can either be switched off when the brake cylinder pressure has become effective, or it can be added to the brake cylinder pressure.

Actuation of switchover valve 63 can be effected either manually from the driver's seat, or automatically. In the latter case the switchover valve 63 can, for example, be automatically switched by the failure of a brake cylinder pressure circuit connected to the switchover valve, in which case the trailer control valve device 19 is then actuated by the pressure supplied by the brake valve 2 via the brake circuit that has not failed. The switchover valve 63 can also be controlled automatically by providing an additional connection between motor vehicle and trailer, such as for instance an electrical connecting line for the anti-locking device.

Within the scope of the invention it is also possible to effect the pressure control of trailer control valve device 19 by electrical means which convert the control pressure into a corresponding electrical value by which, for instance, a solenoid controlled, pilot operated pressure control valve can be actuated.

Within the scope of the invention it is, further, possible to provide at least one device, such as a throttle piece or choke, for smoothing the pressure versus time characteristic of the controlled brake cylinder pressures, the choke device to be mounted between the tractor motor vehicle brake cylinders and trailer control valve device 19. By this provision, deceleration fluctuations are avoided and the compressed air consumption reduced.

It is, of course, also possible to combine design characteristics in FIGS. 1 to 5.

Having now described the invention what we claim as new and desire to secure by Letters Patent is:

1. A fluid pressure brake control apparatus for a wheeled tractor and trailer including at least one brake cylinder for the front wheels of the tractor, at least one brake cylinder for the rear wheels of the tractor and at least one brake cylinder for the trailer, said apparatus comprising:
   a. a manually operable means mounted on the tractor for controlling the supply and release of fluid under pressure to and from the brake cylinders on the tractor, wherein the improvement comprises:
   b. a trailer control valve device operable to control the pressure in said at least one brake cylinder on the trailer,
   c. valve means enabling operation of said trailer control valve device in accordance with the sum of the pressure in said at least one tractor front wheel brake cylinder and said at least one tractor rear wheel brake cylinder while said pressures act in the same direction on said valve means,
   d. electro-responsive brake cylinder pressure controlling means for each of said tractor brake cylinders, each operable after a brake application has been effected to reduce the degree of pressure in the corresponding tractor brake cylinder, the reduction of pressure in at least one of said tractor brake cylinders being effective to cause said valve means to effect operation of said trailer control valve device to correspondingly reduce the degree of pressure in said at least one trailer brake cylinder, and
   e. electrical means carried by each wheel of the tractor and operatively responsive to the rate of change of rotational speed of the respective tractor wheel to effect operation of the corresponding electro-responsive brake cylinder pressure controlling means whereby the pressure in said at least one trailer brake cylinder is substantially simultaneously controlled in accordance with the sum of the pressures in said tractor brake cylinders.

2. A fluid pressure brake control apparatus for a wheeled tractor and trailer, as recited in claim 1, further characterized in that said valve means comprises:
   a. a valve for controlling the supply of fluid under pressure to and the release of fluid under pressure from said trailer control valve device, and
   b. a differential abutment means for operating said valve, said differential abutment means comprising:
      i. a cylindrical member subject at one end to the pressure in one of said tractor brake cylinders,
      ii. a first piston formed in integral with the other end of said cylindrical member and subject to the pressure supplied by said valve to said trailer control valve device, and
      iii. a second piston formed integral with said cylindrical member intermediate the ends thereof and subject on the side thereof adjacent said one end of said cylindrical member to the pressure in the other of said tractor brake cylinders whereby said differential abutment means enables said valve to control the supply and release of fluid under pressure to and from said trailer control valve device cojointly by the pressures in said tractor brake cylinders.

3. A fluid pressure brake control apparatus for a wheeled tractor and trailer, as recited in claim 2, further characterized in that said abutment means is so constructed as to enable operation of said trailer control valve device in accordance with the average value of the pressures in said at least one brake cylinder and said at least one other brake cylinder.

* * * * *